(12) United States Patent
Valencia

(10) Patent No.: US 12,473,159 B2
(45) Date of Patent: Nov. 18, 2025

(54) INDUSTRIAL SWEEPING APPARATUS

(71) Applicant: Diego Andres Duque Valencia, Lethbridge (CA)

(72) Inventor: Diego Andres Duque Valencia, Lethbridge (CA)

(73) Assignee: Diego Andres Duque Valencia, Alberta (CA)

( * ) Notice: Subject to any disclaimer, the term of this patent is extended or adjusted under 35 U.S.C. 154(b) by 424 days.

(21) Appl. No.: 18/331,994

(22) Filed: Jun. 9, 2023

(65) Prior Publication Data
US 2024/0407298 A1  Dec. 12, 2024

(51) Int. Cl.
*B65G 65/48* (2006.01)
*B65G 69/08* (2006.01)
*A01F 12/44* (2006.01)

(52) U.S. Cl.
CPC ......... *B65G 65/4836* (2013.01); *B65G 69/08* (2013.01); *A01F 12/44* (2013.01)

(58) Field of Classification Search
CPC ...... B65G 65/4836; B65G 69/08; A01F 12/44
See application file for complete search history.

(56) References Cited

U.S. PATENT DOCUMENTS

| | | | | |
|---|---|---|---|---|
| 109,441 A | * | 11/1870 | Oerllein | A01D 43/00 56/161 |
| 154,253 A | * | 8/1874 | Hutchinson | A01D 43/02 56/174 |
| 622,072 A | * | 3/1899 | Pratt | A01D 17/10 171/138 |
| 663,834 A | * | 12/1900 | Philipp | A01D 23/04 99/635 |
| 747,611 A | * | 12/1903 | Johnston | A01D 45/02 56/118 |
| 910,321 A | * | 1/1909 | Schumann | E01H 1/042 15/86 |

(Continued)

FOREIGN PATENT DOCUMENTS

| | | | | |
|---|---|---|---|---|
| CN | 108055914 A | * | 5/2018 | A01D 43/02 |
| CN | 111011100 A | * | 4/2020 | A01G 17/02 |

(Continued)

*Primary Examiner* — Arpad Fabian-Kovacs

(57) ABSTRACT

An industrial sweeping apparatus that is configured to be deployed underneath equipment such as but not limited to hay presses wherein the present invention is operable to provide collection of loose material underneath the equipment. The industrial sweeping apparatus includes a longitudinal support member that is positioned above the ground underneath the equipment. A motor and a drive assembly are operably coupled to the longitudinal support member wherein the drive assembly extends the length of the longitudinal support member. A sweeping assembly is movably coupled to the longitudinal support member wherein the sweeping assembly includes a first portion and a second portion. The second portion is perpendicularly oriented with the first portion and extends outward therefrom extending away from the longitudinal support member. A sweeping member is operably coupled to the second portion and is configured to engage loose material as the sweeping assembly traverses the longitudinal support member.

12 Claims, 4 Drawing Sheets

(56) References Cited

U.S. PATENT DOCUMENTS

| | | | | |
|---|---|---|---|---|
| 3,914,925 | A * | 10/1975 | McRobert | A01D 51/002 56/328.1 |
| 4,300,337 | A * | 11/1981 | Sharp | A01D 78/06 56/364 |
| 6,094,847 | A * | 8/2000 | Gallenberg | A01D 17/10 37/432 |
| 6,260,716 | B1 * | 7/2001 | Fontaine | B01D 21/2433 198/732 |
| 9,815,639 | B2 * | 11/2017 | Schuelke | B65G 65/425 |
| 10,508,395 | B1 * | 12/2019 | Madden | E01H 1/042 |
| 2007/0220857 | A1 * | 9/2007 | Derby | A01G 20/43 56/400.01 |
| 2010/0287903 | A1 * | 11/2010 | Hammad | A01G 20/43 56/352 |
| 2016/0212942 | A1 * | 7/2016 | Gilbert | A01D 51/002 |
| 2016/0214523 | A1 * | 7/2016 | Torrison | B60P 1/38 |
| 2019/0183051 | A1 * | 6/2019 | Matsuo | A01D 51/002 |
| 2023/0172112 | A1 * | 6/2023 | Olson | B65G 65/4809 414/327 |
| 2023/0391565 | A1 * | 12/2023 | Olson | B65G 65/4836 |

FOREIGN PATENT DOCUMENTS

| | | | | |
|---|---|---|---|---|
| CN | 111871564 | A * | 11/2020 | B02C 23/16 |
| CN | 111956832 | A * | 11/2020 | A61B 90/70 |
| CN | 112243750 | A * | 1/2021 | B01F 27/60 |
| CN | 112825659 | A * | 5/2021 | A01G 25/092 |
| CN | 219213137 | U * | 6/2023 | B25J 5/02 |
| CN | 117859480 | A * | 4/2024 | A01C 11/003 |
| CN | 118184078 | A * | 6/2024 | C02F 1/04 |
| CN | 221675180 | U * | 9/2024 | B08B 5/02 |
| FR | 2695000 | A1 * | 3/1994 | A01D 45/263 |
| FR | 3125304 | A1 * | 1/2023 | E01H 1/0845 |
| KR | 2017123963 | A * | 11/2017 | A01G 9/14 |

* cited by examiner

INDUSTRIAL SWEEPING APPARATUS

FIELD OF THE INVENTION

The present invention relates generally to industrial equipment, more specifically but not by way of limitation, an industrial sweeper that is configured to be installed underneath a hay pressing machine wherein the present invention provides collection of hay underneath the machine to a single area.

BACKGROUND

Hay is a grass that has been cut and dried to be stored for use most commonly as animal feed either for large animals such as cattle, horses or other livestock. Hay is also used as animal fodder for smaller domesticated animals such as but not limited to rabbits. Hay is utilized as animal fodder when or where there is not enough pasture for the animals to graze an animal or when the weather does not produce growth of natural feed in the pasture. Hay is also utilized as a feed for animals that are kept in areas such as but not limited to barns.

Once the hay is cut from the field the has is dried and subsequently pressed into bales. The bales facilitate easier transport and storage of the hay and are stored in a dry location until ready to be provided to the animals as feed. The hay is formed into bales utilizing a machine known as a hay press. The hay press forms the loose hay into compact bales and binds them with wire or string. These bales of hay that are formed by hay presses can range from a small two-tie bale measuring only a few square feet to large bales that can weigh hundreds of kilograms. During the pressing of the hay into bales, some of the loose hay will fall from the hay press and be deposited onto the floor underneath the hay press. The accumulation of the hay underneath the press must be routinely cleaned as it can potentially interfere with the operation of the press. The hay deposited underneath the hay press is difficult to reach and often requires individuals to enter underneath the press to collect the hay droppings which can be dangerous. Manual collection methods of hay droppings are inefficient and can interfere with the pace of the production of hay bales.

Accordingly, there is a need for an industrial sweeping apparatus that is configured to be mounted underneath a hay press machine wherein the sweeper of the present invention is operable to provide automated collection of hay droppings underneath the hay press during manufacture of hay bales.

SUMMARY OF THE INVENTION

It is the object of the present invention to provide an industrial sweeper that is configured to be mounted underneath a hay press wherein the present invention includes a frame assembly wherein the frame assembly is configured to be secured underneath a hay press.

Another object of the present invention is to provide a sweeping apparatus configured for use in industrial environments such as but not limited to underneath hay presses wherein the frame assembly includes a longitudinal support member.

A further object of the present invention is to provide an industrial sweeper that is configured to be mounted underneath a hay press wherein the longitudinal support member includes a first end and a second end.

Yet a further object of the present invention is to provide a sweeping apparatus configured for use in industrial environments such as but not limited to underneath hay presses that further includes a motor assembly operably coupled to the first end of the longitudinal support member.

Still another object of the present invention is to provide an industrial sweeper that is configured to be mounted underneath a hay press wherein the motor assembly is operably coupled to a drive assembly wherein the drive assembly includes a sprocket and a chain member.

An additional object of the present invention is to provide a sweeping apparatus configured for use in industrial environments such as but not limited to underneath hay presses wherein the frame assembly includes a sweeping assembly wherein the sweeping assembly includes a first portion and a second portion.

Yet a further object of the present invention is to provide an industrial sweeper that is configured to be mounted underneath a hay press wherein the sweeping assembly further includes a sweeping member operably coupled to the second portion of the sweeping assembly and wherein the sweeping member is movable between a first position and a second position.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
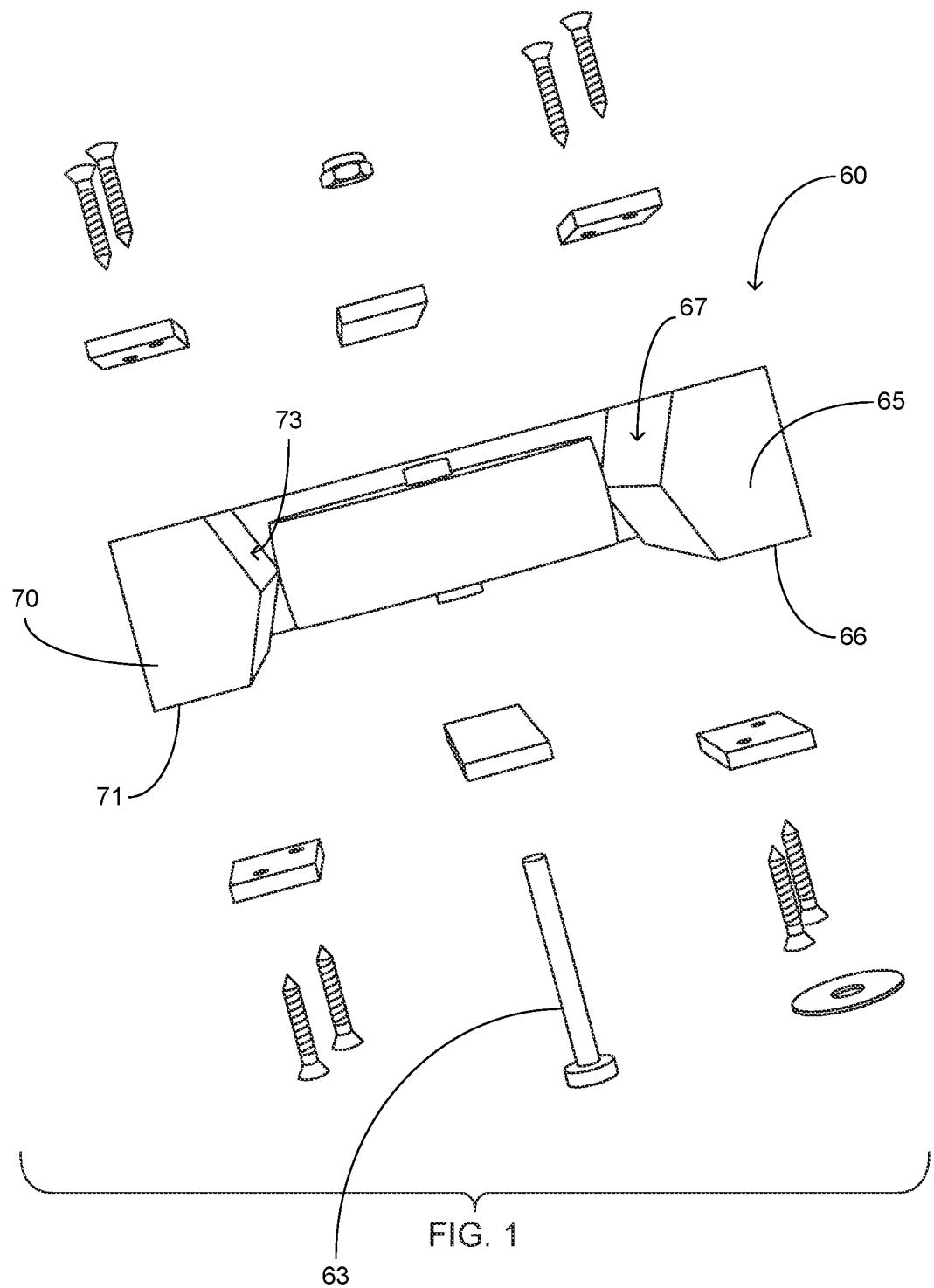
FIG. 1 is a detailed bottom exploded view of a wheel assembly of the present invention.
Figure 2:
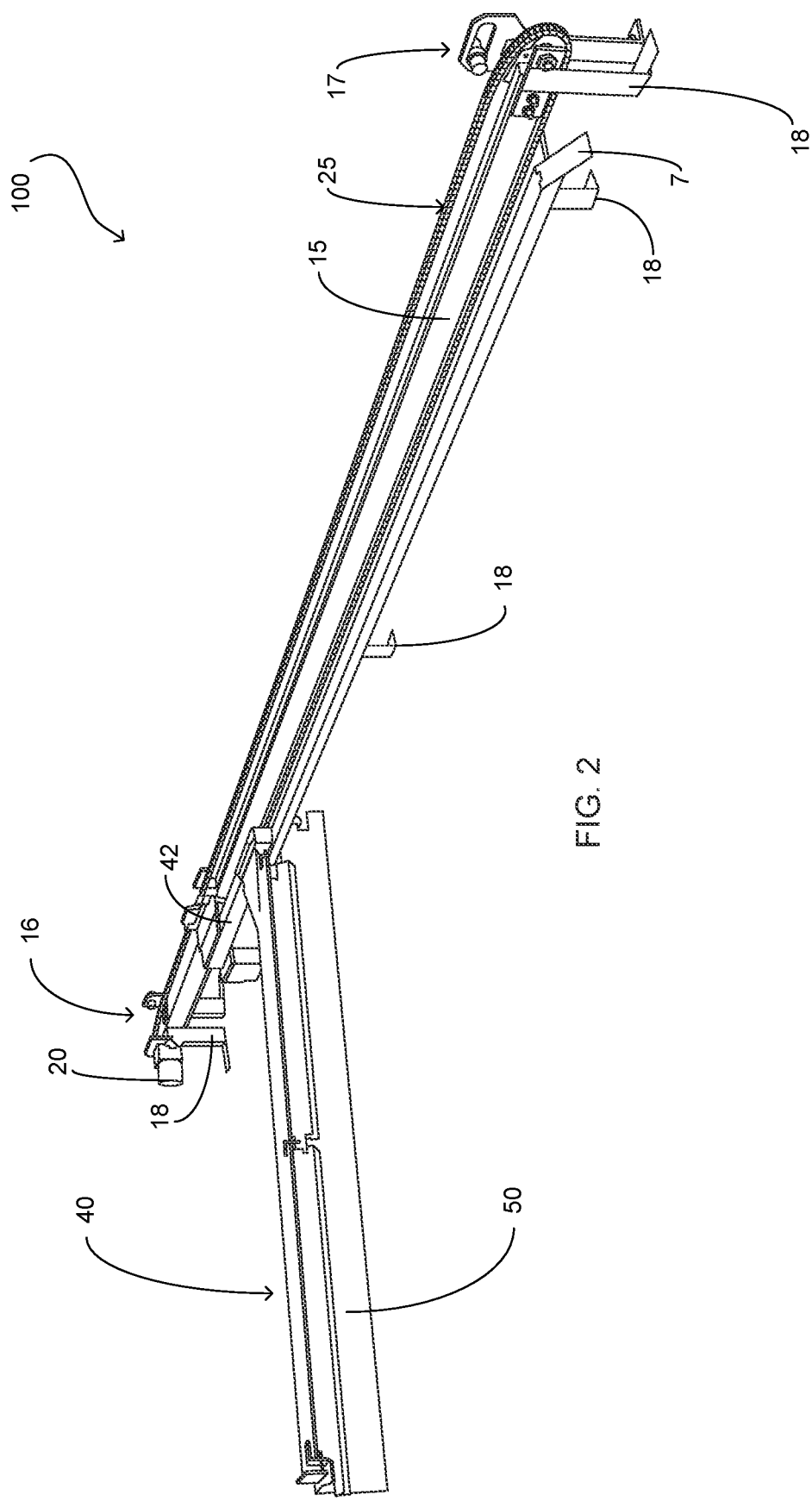
FIG. 2 is an end perspective view of the present invention.
Figure 3:
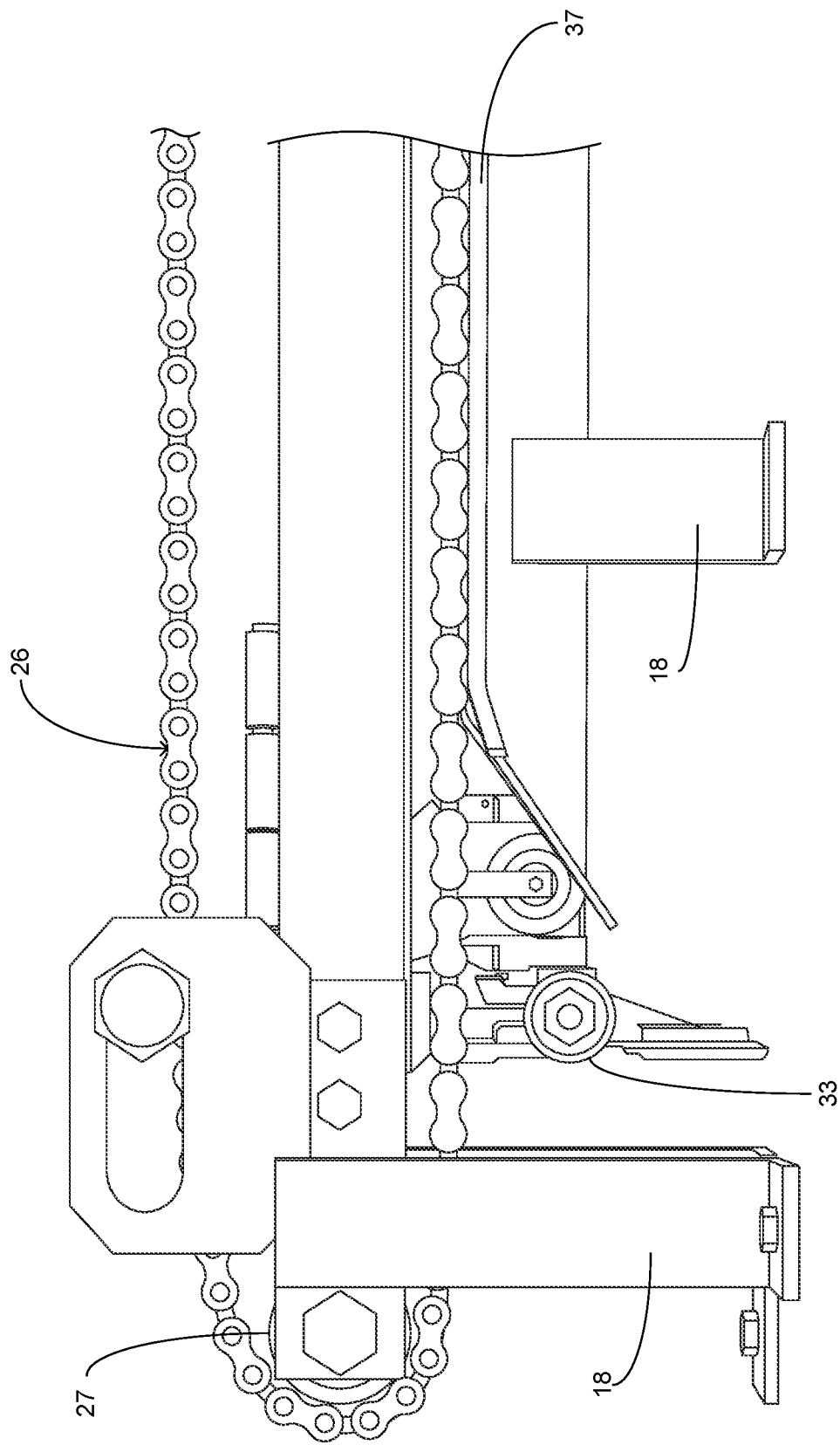
FIG. 3 is a detailed view of the second end of the longitudinal support member.

Referring now to the drawings submitted herewith, wherein various elements depicted therein are not necessarily drawn to scale and wherein through the views and figures like elements are referenced with identical reference numerals, there is illustrated an industrial sweeping apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the industrial sweeping apparatus 100 includes a frame assembly 10 that is manufactured from a suitable durable material such as but not limited to metal. It should be understood within the scope of the present invention that the frame assembly 10 could be manufactured in alternate sizes in order to be placed in a desired location such as but not limited to underneath a hay press. It should be further understood within the scope of the present invention that while an application of being underneath a hay press is discussed herein that the industrial sweeping apparatus 100 could be employed in numerous alternate locations.

The frame assembly 10 includes a longitudinal support member 15 wherein longitudinal support member 15 has a first end 16 and a second end 17. The longitudinal support member 15 is elevated above a support surface on which the industrial sweeping apparatus 100 is superposed utilizing a plurality of leg members 18. Secured to the first end 16 of the longitudinal support member 15 is a motor assembly 20. The motor assembly 20 is a conventional electric motor and is configured to be operably coupled to the drive assembly 25. The drive assembly 25 includes chain member 26 and sprocket member 27 and is operable to facilitate the movement of the sweeping assembly 40 along the longitudinal support member 15. The sweeping assembly 40 is traversed in both directions along the longitudinal support member 15 utilizing the motor assembly 20 and drive assembly 25. While a specific drive assembly 25 and motor assembly 20 has been discussed herein, it is contemplated within the scope of the present invention that the industrial sweeping apparatus 100 could employ alternate elements such as but not limited to hydraulics to facilitate the movement of the sweeping assembly 40 as described herein.

The sweeping assembly 40 includes a first portion 42 and a second portion 45. The first portion 42 and second portion 45 are operably coupled utilizing suitable durable techniques. The second portion 45 is perpendicular with respect to the first portion 42 wherein the first portion 42 is movably coupled to the longitudinal support member 15. The second portion 45 is hingedly coupled to first portion 42 with hinge plate 44. Hinge plate 44 permits movement of second portion 45 along unlevel surfaces and still maintain sweeping member 50 in contact with the ground surface 99. The first portion 42 is configured to slidably traverse intermediate the first end 16 and second end 17 moving in a back-and-forth motion being driven by the motor assembly 20 and drive assembly 25. Operably coupled to the sweeping member 50 proximate longitudinal support member 15 is a bearing protruder member 33. Bearing protruder member 33 is operably to move in an upwards manner towards end member 7 upon reaching second end 17 of the longitudinal support member 15. The upwards movement of the bearing protruder member 33 facilitates return of the sweeping member 50 toward first end 16. Bearing protruder member 33 leaves track member 37 upon reaching end member 7 facilitating the cycle of movement wherein sweeping member 50 traverses in opposing direction along longitudinal support member 15 wherein this back and forth movement cycle is repeated.

The second portion 45 has operably coupled thereto a sweeping member 50. The sweeping member 50 is hingedly secured to the second portion 45 along the upper edge 51 thereof. The sweeping member 50 is planar in manner and is substantially the length of the second portion 45. The sweeping member 50 is manufactured from a suitable material such as but not limited to rubber and the bottom edge 52 is adjacent the ground 99 as the sweeping assembly 40 traverses from the first end 16 towards the second end 17. In this first position of the sweeping member 50, the sweeping member 50 is perpendicular to the ground 99 and as such in a position so as to move hay and other particles along in the direction of travel of the sweeping assembly 40.

Figure 4:
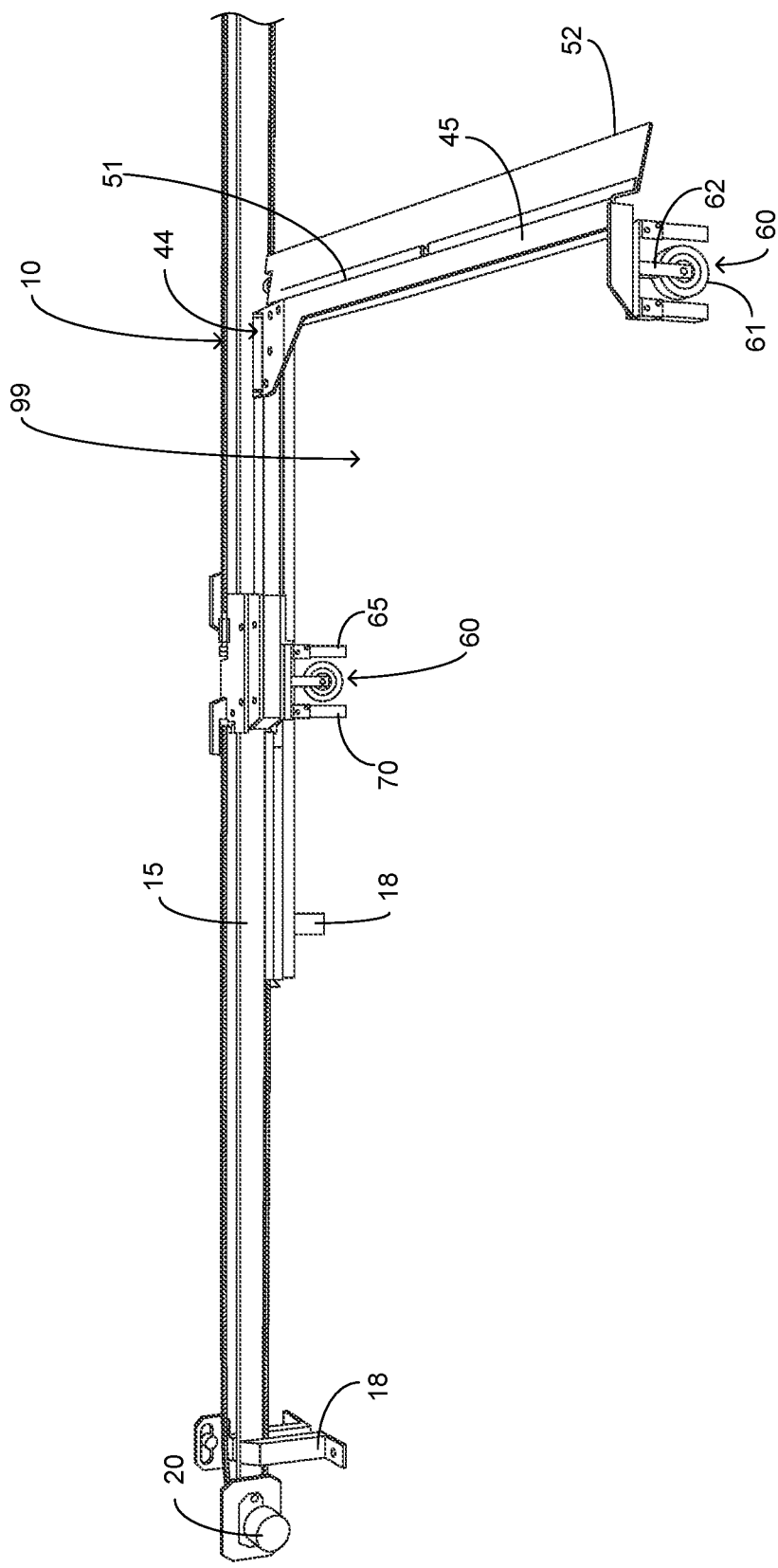
FIG. 4 is a top perspective view of the present invention.

During travel of the sweeping assembly 40 in the direction from the second end 17 to the first end 16, the sweeping member 50 is in its second position. The second position of the sweeping member 50, illustrated herein in FIG. 4, places the sweeping member 50 in a position that is generally parallel with the ground 99. The movement of the sweeping member 50 intermediate its first position and second position along with traversal of the sweeping assembly 40 in the directions discussed herein facilitates movement of loose hay disposed under a hay press to a location wherein the loose hay can be easily collected. The sweeping member 50 is placed in its second position upon reaching second end 17 of the longitudinal support member 15. The longitudinal support member 15 includes end member 7 wherein the end member 7 is configured to operably engage the sweeping member 50 as the sweeping member 50 as the sweeping assembly 40 initiates traversal towards the first end 16. The end member 7 is planar in manner and coupled at an angular orientation with the longitudinal support member 15. The end member 7 transitions the sweeping member 50 from its first position that is substantially parallel to its second position wherein the second position is generally parallel with the ground 99. The second position of the sweeping member 50 inhibits contact with any material disposed on the ground 99 ensuring movement of the material in one direction towards the second end 17. It is contemplated within the scope of the present invention that the end member 7 could be provided in alternate configurations to achieve the desired objective discussed herein. It should be further understood within the scope of the present invention that alternate elements could be employed to provide movement of the sweeping member 50 to its second position.

Referring in particular to FIG. 1, a detailed view of the wheel assembly 60 of the sweeping assembly 40 is illustrated herein. The sweeping assembly 40 includes two wheel assemblies 60 but it is contemplated within the scope of the present invention that the sweeping assembly 40 could have more or less than two wheel assemblies 60. The wheel assembly 60 includes wheel member 61 rotatably mounted to post member 62 utilizing fastener 63. Locating on opposing ends of the wheel member 61 are the first material management member 65 and second material management member 70. The first material management member 65 and second material management member 70 are manufactured from a material such as but not limited to nylon. The first material management member 65 and second material management member 70 function to inhibit the wheel member 61 from becoming clogged with any material that the sweeping assembly 40 is providing movement thereof. The first material management member 65 and second material management member 70 extend the vertical length of the post member 62 and wheel member 61 with the bottom edges 66,71 being adjacent the ground 99 at a distance that inhibits any material from egressing therepast. Both the first material management member 65 and second material management member 70 include rear walls 67,73 that are formed to be angular in manner wherein the form thereof inhibits any material from accumulating adjacent the wheel member 61.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A sweeping apparatus configured to be mounted underneath industrial equipment wherein the sweeping apparatus comprises:
    a longitudinal support member, said longitudinal support member being elongated in form having a first end and a second end, said longitudinal support member being mounted above a ground surface employing a plurality of leg member,
    a sweeping assembly, said sweeping assembly being movably coupled to said longitudinal support member, said sweeping assembly having a first portion and a second portion, said first portion of said sweeping assembly being movably coupled to said longitudinal support member, said second portion being secured to said first portion and further being perpendicular thereto, said second portion extending outward from said longitudinal support member;
    a motor assembly, said motor assembly including at least one motor, said motor assembly being operably coupled to a drive assembly, said drive assembly configured to move said sweeping assembly in a first direction and a second direction along said longitudinal support member; and
    wherein the sweeping assembly is configured to provide movement of materials disposed on the ground surface during said first direction of movement.

2. The sweeping apparatus configured to be mounted underneath industrial equipment as recited in claim 1, wherein said sweeping assembly further includes a sweeping member, said sweeping member being operably coupled to said second portion of said sweeping assembly.

3. The sweeping apparatus configured to be mounted underneath industrial equipment as recited in claim 2, wherein said sweeping member is movably between a first position and a second position.

4. The sweeping apparatus configured to be mounted underneath industrial equipment as recited in claim 3, wherein said sweeping assembly further includes at least one wheel assembly, said at least one wheel assembly having a wheel member configured to traverse along the ground surface.

5. The sweeping apparatus configured to be mounted underneath industrial equipment as recited in claim 4, wherein the at least one wheel assembly further includes a first material management member and a second material management member, said first material management member and said second material management member being opposedly located to said wheel member, said first material management member and said second material management member being axially aligned with said wheel member.

6. The sweeping apparatus configured to be mounted underneath industrial equipment as recited in claim 5, wherein said longitudinal support member further includes an end member at said second end thereof, said end member being planar in manner and angularly oriented with said longitudinal support member, said end member configured to move said sweeping member to said second position.

7. The sweeping apparatus configured to be mounted underneath industrial equipment as recited in claim 6, wherein in said first position said sweeping member is perpendicular in orientation with said second portion and a bottom edge thereof is adjacent the ground surface.

8. The sweeping apparatus configured to be mounted underneath industrial equipment as recited in claim 7, wherein in said second position said sweeping member is parallel said ground surface.

9. The sweeping apparatus configured to be mounted underneath industrial equipment as recited in claim 8, wherein said sweeping member is in said second position during travel of the sweeping assembly from the second end of said longitudinal support member to said first end.

10. The sweeping apparatus configured to be mounted underneath industrial equipment as recited in claim 9, wherein said sweeping member is in said first position during travel of the sweeping assembly from the first end of said longitudinal support member to said second end.

11. The sweeping apparatus configured to be mounted underneath industrial equipment as recited in claim 10, wherein said drive assembly includes a chain member and at least one sprocket member wherein said sprocket member is operably coupled to said second end of said longitudinal support member.

12. The sweeping apparatus configured to be mounted underneath industrial equipment as recited in claim 11, wherein the motor assembly comprises an electric or hydraulic motor.

* * * * *